No. 726,420. PATENTED APR. 28, 1903.
W. A. FRAZIER.
TRUCK.
APPLICATION FILED AUG. 23, 1902.
NO MODEL. 3 SHEETS—SHEET 1.

Witnesses
W. A. Frazier, Inventor.

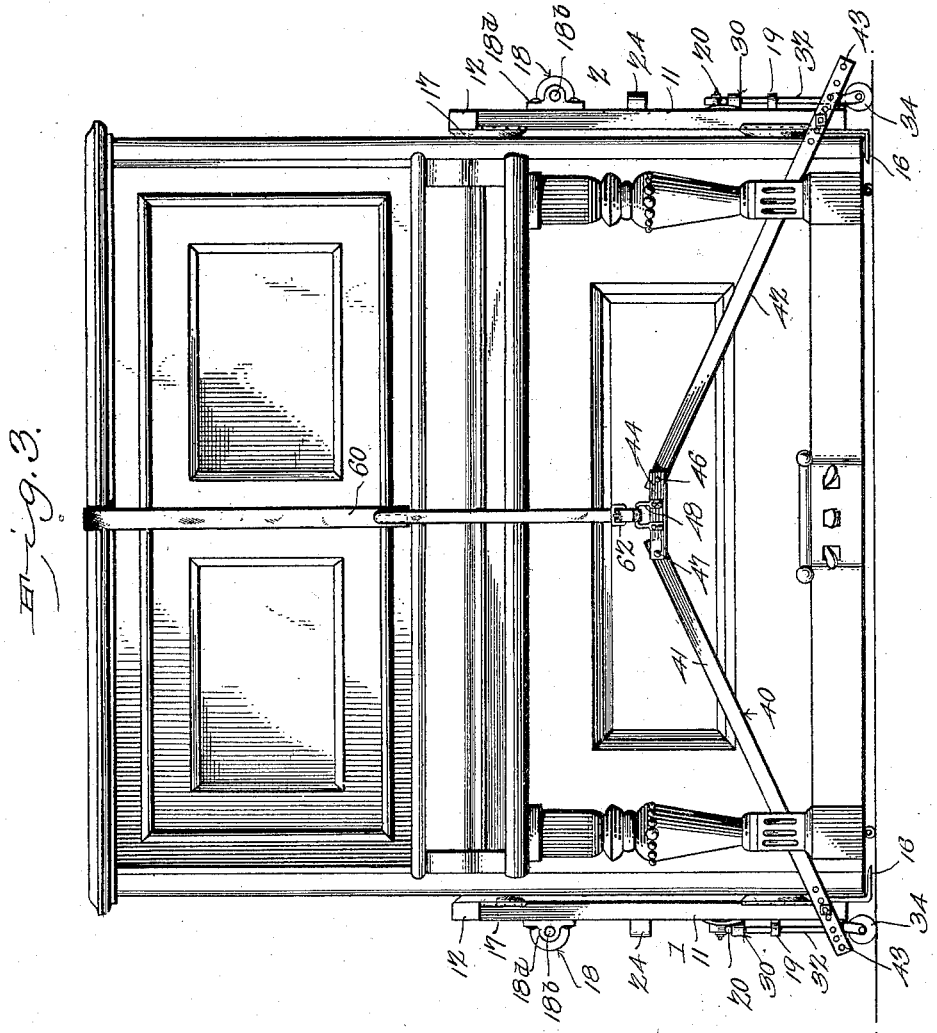

No. 726,420. PATENTED APR. 28, 1903.
W. A. FRAZIER.
TRUCK.
APPLICATION FILED AUG. 23, 1902.
NO MODEL. 3 SHEETS—SHEET 3.
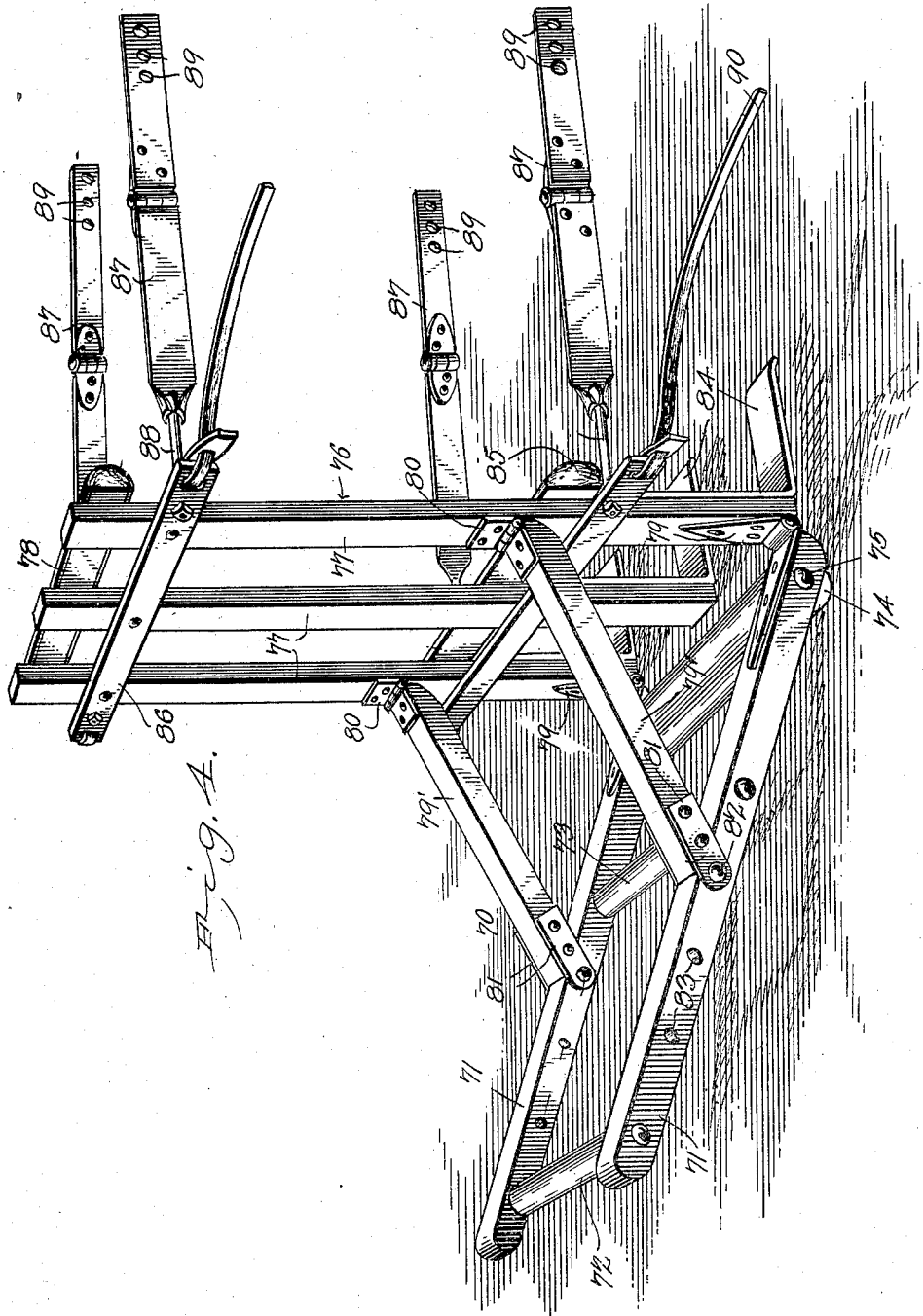
Witnesses
W. A. Frazier, Inventor.
by C. A. Snow & Co.
Attorneys

UNITED STATES PATENT OFFICE.

WILLIAM A. FRAZIER, OF CLARINDA, IOWA.

TRUCK.

SPECIFICATION forming part of Letters Patent No. 726,420, dated April 28, 1903.

Application filed August 23, 1902. Serial No. 120,853. (No model.)

*To all whom it may concern:*

Be it known that I, WILLIAM A. FRAZIER, a citizen of the United States, residing at Clarinda, in the county of Page and State of Iowa, have invented a new and useful Improvement in Trucks, of which the following is a specification.

This invention relates to an improved truck for moving boxes, cases, safes, pianos, and the like.

The object of the invention is to provide a truck which is especially adapted for use in piano-moving and from which one of the members may be detached and used as a single truck.

The invention consists in the peculiar construction and combination of parts hereinafter fully described and claimed.

Figure 2:
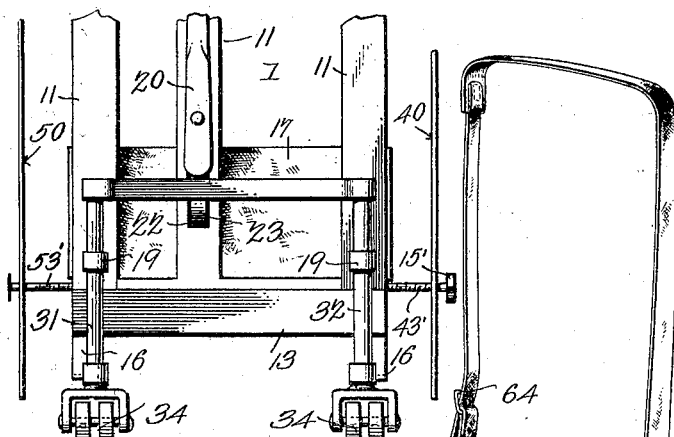
Figure 1:
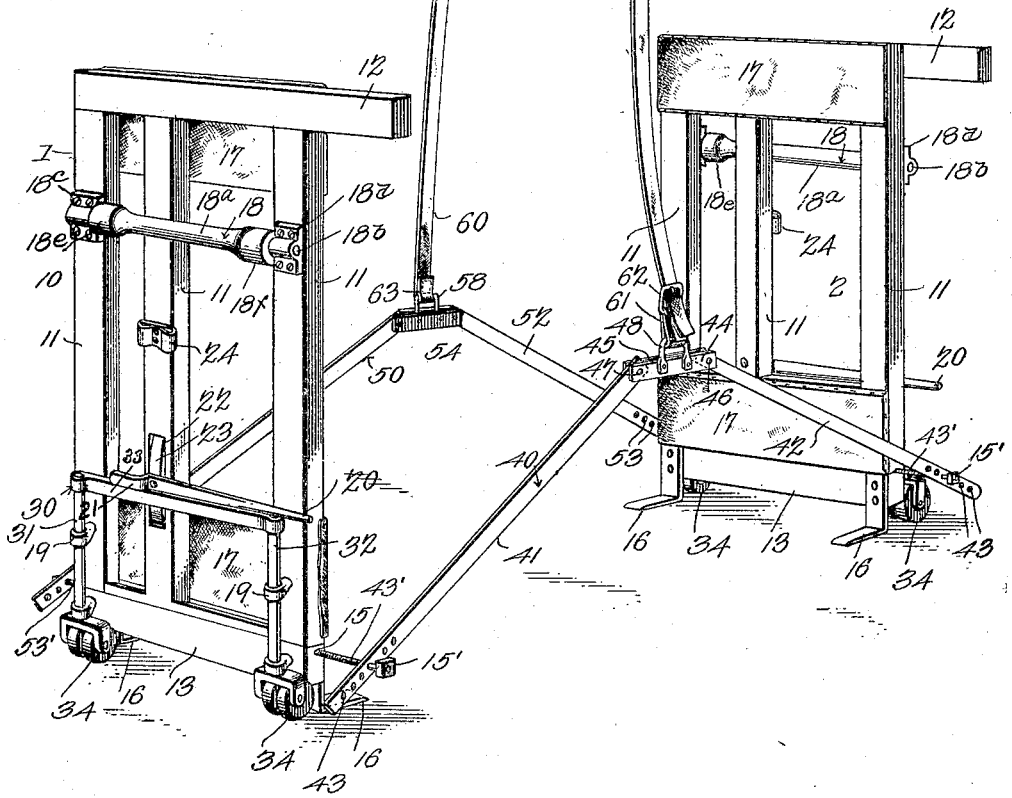

In the accompanying drawings, Figure 1 represents a perspective view of a truck constructed in accordance with the preferred form of this invention. Fig. 2 represents an end view of one of the truck members shown in Fig. 1, the lever in this figure being shown in raised position and the rest-frame connected therewith correspondingly elevated in position ready for moving, the upper portion of the truck being shown broken off. Fig. 3 represents a side elevation of this improved truck, showing it employed in moving a piano. Fig. 4 represents a perspective view of a modified form of one member of this improved truck.

The same reference-numerals indicate corresponding parts in all the figures.

In the form of this invention illustrated in Figs. 1, 2, and 3 of the accompanying drawings two supporting clamping truck members 1 and 2 are shown separably connected by improved mechanism hereinafter to be described. This embodiment of the invention is especially adapted for use in moving pianos and other large objects; but one of the truck members may be disconnected and used as a single truck for moving small boxes, trunks, and the like. The truck members 1 and 2 are similarly constructed, and hence for the sake of convenience the member 1 only will be described in detail. The truck member 1, which constitutes one clamping member of this improved truck, comprises two connected frames, one of which is preferably slidable upwardly on the other and which will be designated as the "rest-frame" 10, which engages and holds the object to be moved, and the supporting or trundling frame 30, which supports the frame 10 and the object to be carried thereby.

The rest-frame is composed of bars, as 11, which are connected at their upper ends by a cross-bar 12, having one end thereof projected some distance beyond the terminal bar 11 on one side of the frame, and this protruding end serves as a protector for the projecting keyboard when used in moving an upright piano. A cross-bar 13 connects the lower ends of the bars 11 and is provided at its opposite ends with screw-threaded apertures, as 15, for receiving screws or pins attached to the connecting mechanism hereinafter to be described. On the lower front side of the rest-frame 10 are lifting-fingers 16, here shown as right-angled plates, the upright portions of which are bolted to the bars 11, and the lower laterally-extending portions frictionally engage the floor or other supporting-surface and hold the frame 10 in upright steady position ready to receive the object to be moved. The front side of this frame 10 is padded at its upper and lower ends, as at 17, to prevent injury to the article being moved, and it is provided at the rear side thereof with a handle 18, which extends across the upper portion and is adapted to be grasped by the person using the truck. This handle 18 is preferably made in the form of a roller having the central portion thereof cut away at $18^a$ and the ends reduced, as at $18^b$, and rotatably mounted in bearings $18^c$ and $18^d$, disposed on opposite sides of the frame 10. The enlarged portions $18^e$ and $18^f$ left between the cut-away central portion and the reduced ends are adapted to act as casters or rollers for engaging the floor or other supporting-surface and supporting one end of the truck member when it is stood on end. This handle when so constructed serves the double function of a handle for moving the truck and as a roller or antifriction device for movably supporting the truck member when it is turned with its rear face downward, the truck member being then adapted to be trundled about like the ordinary truck. This supplemental roller adapts the truck member to be used separately as a single truck for conveying boxes, trunks, and like articles, the roller 18 acting in conjunction with the casters 34 to support the truck member. The lower rear faces of the outer bars 11 are provided with laterally-extending eyes, as 19, which have their openings arranged in alinement for a purpose soon to be described. The middle bar of the series 11 has an operating-lever 20 fulcrumed thereon. This bar has a recess 22, in which a spring 23 is disposed, and this spring bears against the lever 20 and holds it out of contact with the bar, thereby permitting said lever to swing freely without friction. The lower end of this lever is offset at 21, and this offset portion is adapted to bear on the cross-bar of the frame 30, while the upper end thereof is enabled to lie sufficiently near the middle bar 11 when in raised position to be engaged by a spring-clip 24, fastened to the middle bar 11 above the fulcrum-point of the lever 20. This clip 24 engages and holds the said lever 20 in upright position and prevents its accidental lowering during the moving operation. The frame 30 comprises two metal rods 31 and 32, which are run through the eyes, as 19, of the frame 10 and which are connected at their upper ends by a cross-bar 33, preferably of metal. These rods are preferably disposed in vertical position and are provided at their lower ends with rollers or casters, as 34. They are made of a height sufficient to bring the cross-bar 33 adjacent to and directly under the lever 20 when said lever is disposed in lowered or horizontal position. The frame 10 is adapted to slide on the rods 31 and 32 by means of the eyes 19, through which the rods are passed, and when the fingers 16 have been run under the object to be moved the lever 20 is raised into upright position, with its lower end bearing on the cross-bar 33, and the frame 10 is raised a distance equal to the length of the lever from its fulcrum to its lower end. The upper end of this lever is then engaged by the clip 24 and the lever held in upright position.

The end truck member 1 is connected with the oppositely-disposed member 2 by means of an adjustable extensible connection now to be described. The connecting means for the truck members 1 and 2 comprise two straps 40 and 50, preferably composed of metal, which are attached at their opposite ends to the frames, these straps being disposed on opposite sides of the truck and connected together near their centers by means of a flexible strap 60, preferably composed of leather. The straps 40 and 50 are constructed exactly alike, and hence the strap 40 only will be described in detail. This strap 40 is composed of two metal members 41 and 42, preferably made from flat strips of steel, and they are provided at their outer ends with longitudinally-alined perforations, as 43, through which pins 43' pass and enter the apertures 15 in the ends of the cross-bars 13 of the truck members 1 and 2. A number of holes are provided in each end to render the strap adjustable and to adapt the truck to fit pianos or boxes of varying sizes. The inner ends of these strips 41 and 42 are disposed between the opposite ends of two plates or strips 44 and 45 and are pivotally connected thereto by means of pivots 46 and 47. An angular eye or metal strap 48 is riveted to the central plates 44 and 45, and a leather loop 61 is attached thereto. This loop 61 is connected with a buckle 62 for engaging one end of the strap 60. The strap 50 being similar in construction to the strap 40 has the pins 53' thereof passed through the perforations in its opposite ends into the apertures 14 on the other side of the truck members 1 and 2. The eye 58 of the said strap 50 is engaged by a loop 63, formed on one end of the leather strap 60. The strap 60 is also preferably provided with another buckle 64, which is designed to lie on the side opposite the buckle 62, so that the strap may be tightened by a person on either side of the piano or other article being moved.

The use of this improved truck will now be described in connection with the moving of a piano. The levers 20 of the truck members 1 and 2 are first lowered into horizontal position, as shown in Fig. 1, and the frame 10 is correspondingly lowered until the fingers 16 thereof rest on the floor or other supporting-surface and by means of which the frames are held in upright position ready to receive the object to be moved. When the fingers 16 have been run under the ends of the piano, as shown in Fig. 3, the metal straps 40 and 50, which extend along the front and rear of the piano, are contracted as follows: The strap 60 is passed over the top of the piano, it being connected, as above described, to the metal straps, and one of the buckles 63 or 64 is operated to tighten said strap. This tightening of the strap 60 exerts an upward pull on the jointed metal straps 40 and 50, and through them the truck members 1 and 2, connected therewith, are drawn toward each other and tightly clamped against the ends of the piano, as shown clearly in Fig. 3. The levers 20 are then raised into upright position, carrying with them the rest-frames 10 and the piano supported thereby. When the levers have been raised to an upright position, with the lower ends thereof engaging and bearing on the cross-bars 33 of the frames 30, the spring-clips 24 are sprung over their upper ends and hold them against accidental displacement. The piano may then be trundled from place to place, the antifriction supporting means of the frame 30 serving as wheels for the truck.

In the embodiment of this invention as shown in Fig. 4 the truck member 70 is provided with handle-levers, as 71, which are connected together by rungs 72 and 73, which are adapted to be directly grasped by the person operating the truck. An antifriction-support, here shown in the form of a roller 74, is disposed between the lower ends of the levers 71 and has its bearings therein, as at 75. Suitable wheels may be substituted for the rollers, as will be understood. A frame 76, which in the embodiment of the invention here shown in Fig. 4 comprises the upright bars 77 and the cross-bars 78, which connect them together, has its lower end connected to the lower end of the frame formed by the levers 71 and rungs 72 and 73 by hinges 79. The said hinges are secured on the said levers 71 and to the lower ends of the outer bars 77 of frame 76. Brace-bars 79' have their upper ends connected to the outer bars 77 of the frame 76 by hinges 80, the inner free ends of said bars 79' being provided with keepers, which are here shown as extended plates 81, that bear on the sides of the lever or handle bars 71 and are adjustably attached thereto by pins or bolts 82, which pass through openings in said plates 81, and suitable adjusting-openings 83, with which the bars 71 are provided. On the lower front side of the frame 76 are lifting-fingers 84, which are similar to those shown in the other figures. The cross-bars 78 of frame 76 are padded on their front sides, as at 85. Cross-bars 86 are disposed on the rear sides of frame 76 and bolted or screwed thereto, as shown, and the ends of said cross-bars 86, which are preferably made of iron or steel, project beyond the sides of the frame. Hinge-straps 87 are attached to the projecting portions of cross-bars 86 by bolts 88. The outer portions of said hinge-straps are provided with openings 89. Straps 90 are used in connection with the hinge-straps 89 to secure a box, case, or the like of moderate size on the front side of frame 76.

It will be understood that in using this form of truck the bars 79' are first loosened from the levers 71, the latter raised at their rear ends, thereby lowering the frame 76 and the fingers 84, and when the latter have been run under the box or case and the same secured thereon and against the front side of frame 76 by the straps the bars 79' are re-attached to the levers 71 in an appropriate place, and when the outer ends of the latter are depressed the frame 76 is elevated, thereby raising the box or case, which may then be readily trundled from place to place.

When moving a piano or packing-case with this form of truck member, a pair thereof will be used, which will be disposed at opposite ends thereof in a manner similar to that shown in Fig. 3.

I claim as my invention—

1. A truck comprising relatively movable end members, longitudinal side members connecting said end members and each composed of intermediately-jointed metal straps pivotally and detachably connected at their remote ends to said end members, and means transversely spanning the interval between the straps for deflecting the intermediate portions thereof and drawing said truck members toward each other.

2. A truck comprising supporting truck members having screw-threaded apertures in the lower ends on the opposite sides thereof, jointed metal straps having perforations in their opposite ends, pins adapted to pass through said perforations and enter said apertures, and means for tightening said straps.

3. In a truck, the combination of supporting end frames, means for connecting and drawing together said frames, said means comprising an adjustable flexible strap connected at its opposite ends with pivotally-connected bars, said bars being provided at their free ends with means for removably attaching them to said end frames, and a tightening device for said flexible strap.

4. A truck comprising relatively movable end members for engagement with an interposed object, side members adjustably connected with said end members and each comprising two metal bars provided with a series of perforations at their outer ends, a plate pivotally connected at its opposite ends to the inner ends of said bars, and connections between said plates for transversely spanning the object between the end members.

5. In a truck, the combination of supporting truck members having adjustable connections for the opposite sides thereof, each of said connections comprising two metal bars provided at their outer ends with a series of longitudinally-alined perforations, two parallel plates having the inner ends of said bars disposed between them and pivotally connected therewith, and means connected with the plates on the opposite sides of the truck and adapted to transversely span the article to be moved.

6. In a truck, the combination of connected truck-frames, each of which comprises a supporting member, a rest member slidably connected with said supporting member, a lever fulcrumed on said rest member and adapted to engage said supporting member, and means attached to said rest member for engaging and holding said lever in upright position.

7. In a truck, the combination of separably-connected truck-frames, each of said frames comprising a rest member having a lever fulcrumed thereon, and provided with lifting-fingers, eyes attached to said rest member on opposite sides of its rear face, vertical rods mounted in said eyes and having antifriction supporting means, and a cross-bar connecting the upper ends of said rods and adapted to be engaged by said lever whereby the rest member may be raised on the uplifting of the lever and lowered when the lever is lowered.

In testimony that I claim the foregoing as my own I have hereto affixed my signature in the presence of two witnesses.

WILLIAM A. FRAZIER.

Witnesses:
CLAUDE M. STANLEY,
A. M. GRAHAM.